United States Patent Office 3,453,129
Patented July 1, 1969

3,453,129
METHOD OF PREPARING A RUTILE TITANIUM DIOXIDE-ANHYDRITE COMPOSITE PIGMENT
Bernard J. Hoffmann, St. Louis, Lester E. Olmsted, Affton, and William Swartz, St. Louis, Mo., assignors to National Lead Company, New York, N.Y., a corporation of New Jersey
No Drawing. Filed Mar. 9, 1967, Ser. No. 621,748
Int. Cl. C09c 1/02, 1/36
U.S. Cl. 106—300                     4 Claims

ABSTRACT OF THE DISCLOSURE

This invention relates in general to a method for preparing a high quality titanium dioxide-anhydrite composite pigment in which the titanium dioxide is in the rutile crystal form. The process comprises preparing a particular type of titanium hydrate which converts substantially completely to rutile during calcination without adding a titanium-containing rutile promoter as a precalcination treatment.

BACKGROUND OF THE INVENTION

In the prior art processes for making composite pigments containing titanium dioxide and calcium sulfate, it is customary to hydrolyze a titanium sulfate solution in the presence of an extender, e.g., calcium sulfate anhydrite, thus forming a coalesced mixture of the titanium hydrate and anhydrite and the mixture is then calcined to form a titanium dioxide-anhydrite composite pigment. In most of these prior art processes small amounts of zinc oxide and a titanium-containing rutile converting seed or rutile promoter must be added to the hydrate-anhydride mixture prior to calcination in order to effect conversion of the titanium dioxide values to the rutile form during subsequent calcination to produce the composite pigment. Other prior processes have the disadvantage of producing a titanium hydrate-anhydrite mixture which is slow filtering and difficult to settle and wash. In these particular processes in which the titanium hydrate-anhydrite mixture formed is difficult to settle and filter, it is substantially impossible to operate on a commerical scale. In this connection it should be pointed out it is generally necessary to obtain a settling rate of the hydrolysis mixture of at least 8 cm./hr. for a commercial operation.

In the instant invention the titanium hydrate-anhydrite mixture is formed in such a way that the mixture is fast filtering and upon calcination rutile titanium dioxide is formed without using a titanium-containing rutile promoter as a precalcination treatment.

SUMMARY OF THE INVENTION

The instant invention describes a method for preparing a rutile titanium dioxide-anhydrite pigment which comprises hydrolyzing a titanium sulfate-ferrous sulfate solution in the presence of an anhydrite slurry to form a particular type of a fast filtering hydrate which will form rutile composite pigment upon calcination by adding zinc oxide alone as a precalcination treating agent thereby eliminating the need of employing a titanium-containing rutile promoting agent.

The process comprises adding to an anhydrite slurry a certain critical amount of the titanium sulfate solution to form an initial mixture, heating the initial mixture for a certain period of time within a particular temperature range to cure the mixture, heating the cured mixture to boiling temperature and while boiling adding the remainder of the titanium sulfate solution to the initial mixture over a given period of time and boiling the final mixture to hydrolyze the remainder of the titanium values.

The titanium hydrate-anhydrite mixture obtained is fast filtering and upon calcination converts to rutile without adding a titanium-containing rutile promoter.

DESCRIPTION OF THE PREFERRED EMBODIMENT

The source material for the titanium values in the titanium sulfate solution is from an ilmenite ore or slag composition. This material is digested in concentrated sulfuric acid to form a solution of titanium sulfate and ferrous sulfate using digestion methods well known in the art.

In carrying out the process of the instant invention, a calcium sulfate aqueous slurry and a titanium sulfate-ferrous sulfate solution are first prepared, the amounts of said slurry and said solution being calculated to produce a composite pigment of a predetermined composition. In this connection the composition of composite pigments of this type comprises in general, $CaSO_4$ anhydrite and various amounts of $TiO_2$, the latter usually ranging from 25% to 60%, the remainder being $CaSO_4$ anhydrite. The two most common compositions comprise the anhydrite plus about 30% and 50% $TiO_2$ respectively. Initially from 7% to 40% of the titanium solution is admixed with the entire amount of calcium sulfate slurry, the sulfuric acid and $TiO_2$ content of the initial mixture being from 10.0% to 17.0% $H_2SO_4$ and from 2.5% to 6% $TiO_2$.

The temperature of the anhydrite slurry and the titanium sulfate solution should be raised so that the initial mixture should fall within the range of from 80° C. to 98° C. This initial mixture is then cured at 90° C. to 98° C. for 30 to 90 minutes. This heated cured initial mixture is brought to a boil and boiled while the remainder of the titanium solution is added over a period of from 45 to 90 minutes and the final mixture is further boiled from ½ to 2 hours to hydrolyze the remainder of the titanium values. The titanium hydrate-anhydrite mixture formed by using this hydrolysis procedure possesses the unusual characteristics of being fast settling, rapid filtering and the titanium hydrate being selfconverting to rutile upon calcination. These characteristics are developed by the unique hydrolysis method described in the instant invention.

The $CaSO_4$ anhydrite to be used in the production of the $TiO_2$-anhydrite composite pigment of this invention is prepared in any well known manner as, for example, by the process described in U.S. Patent No. 2,956,859 and is employed as an aqueous slurry containing from 12% to 32% calcium sulfate anhydrite. The amount of anhydrite slurry to be made up is governed by the amount of titanium sulfate solution to be used in the preparation of a composite pigment having a predetermined $TiO_2$-anhydrite composition. It is necessary to have present in the anhydrite liquor at least 7% $H_2SO_4$ before adding the titanium solution.

The titanium sulfate solution to be used is prepared by the sulfuric acid digestion of an ilmenite ore or slag material, a procedure which is well-known in the art. The titanium sulfate solution formed will also contain ferrous sulfate which remains in soluble form during the subsequent hydrolysis step and hence can be satisfactorily removed from the composite titanium hydrate-anhydrite mixture during the washing and bleaching steps which follow hydrolysis. Prior to the hydrolysis the titanium sulfate solution employed should contain from 8% to 10% $TiO_2$ and from 15% to 20% $H_2SO_4$, the $H_2SO_4/TiO_2$ weight ratio being from 1.8 to 2.3.

More particularly the titanium hydrate-anhydrite hydrolysis mixture from which the composite titanium dioxide-anhydrite pigment is produced is prepared by first admixing from 7% to 40% of the titanium sulfate solution described above with all of the calcium sulfate anhydrite slurry referred to hereinafter as the initial hydrolysis mixture.

In preparing a composite pigment containing about 30% $TiO_2$, i.e., at the lower and of the broad range of $TiO_2$-anhydrite composite pigments containing from 25% to 60% $TiO_2$, it is preferred to add from 20% to 40% of the titanium sulfate solution to form the initial mixture; while at the upper end of the broad range i.e., about 50% $TiO_2$ in the composite pigment, it is preferred to add from 7% to 30% of the titanium solution to form the initial mixture.

In preparing composite pigments containing about 30% $TiO_2$, the liquor in the initial mixture should contain from 10% to 17% $H_2SO_4$ and from 2.5% to 4.5% $TiO_2$, while preparing composite pigments containing about 50% $TiO_2$, the initial mixture should contain from 10% to 17% $H_2SO_4$ and from 2.5% to 6% $TiO_2$. The required acidity of sulfuric acid in the initial mixture in some cases is automatically obtained in preparing the composite pigment while in some instances, small amounts of $H_2SO_4$ may be added to the anhydrite slurry if desired. It is particularly desirable to add some $H_2SO_4$ to the anhydrite slurry when larger amounts of the titanium solution are used to form the initial hydrolysis mixture. The temperature of the anhydrite slurry, prior to the addition of the sulfate solution, may vary from room temperature to 98° C., while the temperature of the titanium sulfate solution may be from 45° C. to 60° C. However it is necessary that this initial hydrolysis mixture reach a temperature of at least 80° C. but not above 98° C. before proceeding to the next step in the process.

The initial hydrolysis mixture is then processed further preferably in one of two ways depending upon whether a low or high $TiO_2$-composite pigment is being produced.

In the case of producing a low $TiO_2$ composite pigment, containing for example, 30% $TiO_2$, the initial mixture is processed as follows:

The mixture is heated to a temperature between 90° C. and 98° C. and is held within that temperature range for 30 to 90 minutes. After this curing time the cured mixture is heated to a boil and the remainder of the titanium sulfate solution is added slowly to the boiling cured mixture over a period of 30 to 90 minutes and the entire mixture is boiled for an additional ½ to 2 hours to hydrolyze the remaining titanium values.

The preferred method of processing a high $TiO_2$ composite pigment, e.g., 50% $TiO_2$, the initial mixture is heated to a temperature between 90° C. and 98° C. and held within that temperature range from 30 to 90 minutes to cure the mixture. The cured mixture is then heated to a boil and the remainder of the titanium sulfate solution is slowly added to the boiling cured mixture over a period of 40 to 100 minutes and the entire mixture is boiled for an additional ½ to 2 hours to hydrolyze the remaining titanium values.

In either case the final mixture of titanium hydrate and anhydrite is allowed to settle and is then washed and bleached in the usual manner to remove the iron and other colored impurities after which it is dewatered, treated with 0.2% to 2% ZnO on a weight bases and calcined to produce a rutile $TiO_2$-anhydrite composite pigment.

In order to describe the instant invention more fully the following examples are presented:

Example I

In this example a rutile $TiO_2$-anhydrite composite pigment of the composition 50% $TiO_2$ and 50% anhydrite was prepared as follows:

PREPARATION OF THE TITANIUM SULFATE SOLUTION

In this particular run an ilmenite ore containing 45% $TiO_2$, 38% FeO and 5% $Fe_2O_3$ was ground to 4.5% +200 mesh and digested in the usual manner with concentrated sulfuric acid to form a so-called "digestion cake" which was dissolved in weak sulfuric acid. The solution was then treated with scrap iron to reduce the ferric iron values to ferrous sulfate and after clarification to solution had the following analysis:

| | |
|---|---|
| $TiO_2$, percent | 8.5 |
| $FeSO_4$, percent | 20.4 |
| $H_2SO_4$, percent | 15.4 |
| $H_2SO_4/TiO_2$ | 1.8 |
| Specific gravity (50° C.) | 1.520 |

PREPARATION OF THE CALCIUM SULFATE ANHYDRITE SLURRY

Finely divided calcium sulfate anhydrite was prepared according to the method described in U.S. Patent No. 2,956,859 issued Oct. 8, 1960 to Warren Rodgers et al., wherein a minor portion of gypsum was added to 78% $H_2SO_4$ at a temperature of 40° C., at the rate of 0.06 part gypsum per minute for each part of sulfuric acid to form a seed, the remaining gypsum being then added to the anhydrite seed at 80° C. and the mixture was heated to boiling to convert all of the gypsum to anhydrite. This anhydrite was then employed as a slurry for the purpose hereinafter described.

PREPARATION OF COMPOSITE $TiO_2$ PIGMENT BY HYDROLYSIS OF TITANIUM SULFATE SOLUTION IN THE PRESENCE OF ANHYDRITE 1130 grams of calcium sulfate anhydrite slurry containing 31% solids and 56 grams of $H_2SO_4$ were heated to 90° C.; the acid concentration in the liquor amounted to 7.2% $H_2SO_4$.

678 grams of the titanium sulfate solution comprising 17% of the total sulfate solution to be used, were heated to 50° C. and added to the anhydrite slurry at 90° C. over a period of 12 minutes to form an initial hydrolysis mixture containing 11% $H_2SO_4$ and 4% $TiO_2$. This initial hydrolysis mixture was heated to 95° C. and held at 95° C. for 70 minutes, after which the mixture was heated to a boil and boiled while the remaining 83% of the titanium sulfate solution was then added slowly (i.e. over a period of 90 minutes) to the initial hydrolysis mixture to form the final hydrolysis mixture which was boiled for an additional 1½ hours, after all of the solution had been added, to hydrolyze all of the titanium values in the mixture. The titanium hydrate-anhydrite mixture was allowed to stand and was found to have a rapid settling rate of 27 cm./hr. After decanting, washing and bleaching, the titanium hydrate-anhydrite mixture was treated with 0.5% ZnO and was calcined at a rate of 90° C. per hour increase, over a temperature range from 800° C. to 975° C. to produce a calcined composite pigment which when ground in the usual manner possessed the following properties:

| | |
|---|---|
| Tinting strength | 1005 |
| Rutile (percent) | 91 |
| Color brightness | 94.4 |
| Color tone | −8.2 |
| Spectral characteristics | 0.4 |
| $TiO_2$ (percent) | 50.0 |

It should be noted that the titanium dioxide in the composite pigment was present in the rutile crystal form and that it was produced without adding a titanium-containing rutile promoter in addition to the ZnO added to the hydrolysis mixture. In addition it should also be called to attention that the titanium hydrate-anhydrite mixture produced settled rapidly and that no yield seed was required to obtain this desirable property.

The percentage of the $TiO_2$ present as rutile as was determined by X-ray diffraction and the tinting strength was determined by the well-known Reynolds' Tinting Strength Method as described in Physical and Chemical Examination of Paints, Varnishes, Lacquers, and Colors by H. V. Gardner, Ninth Edition, May 1939, page 37.

The color brightness and tone were determined by the following methods:

COLOR BRIGHTNESS AND TONE OF PIGMENT IN ALKYD VEHICLE

This test determined instrumentally the brightness and tone of the titanium dioxide-calcium sulfate composite pigment in a wet film of alkyd vehicle. The pigment was dispersed in a soya alkyd vehicle and the green, red and blue reflectance values of the wet film were measured. The green reflectance value was taken as a measurement of the brightness of the pigment and the blue minus red reflectance values as a measure of the color tone. The determinations were made on a Colormaster Differential Colorimeter manufactured by Manufacturers Engineering and Equipment Corp. Hatboro, Pa.

The pigment was mixed with a soya alkyd resin to form a paste and the paste was applied to the surface of a high reflectance white ceramic panel, the thickness of the paste film being sufficient to eliminate the background color. The green, red and blue reflectance values of the film were read on the Colormaster and the reflectances were recorded as percent reflectance.

The spectral characteristics of the composite pigment was determined as follows:

SPECTRAL CHARACTERISTICS OF PIGMENT IN A PAINT VEHICLE

The pigment was mixed with a soya alkyd vehicle containing carbon black and the mixture was formed into a paste. The ratio of the composite pigment to carbon black present in the paste was 5 to 0.06. The paste was then spread onto a lacquered sheet and the wet film was immediately tested in the Colormaster Colorimeter described above. The blue and red reflectance values were obtained. The spectral characteristic of the pigment was measured by comparing the result obtained by subtracting the blue from the red reflectance values and comparing this result with the spectral characteristics of a standard pigment previously determined.

TITANIUM HYDRATE-ANHYDRITE MIXTURE SETTLING RATE DETERMINAION

A slurry comprising 130 ml. of the freshly prepared titanium hydrate-anhydrite mixture at 15% solids was placed in a 500 ml. graduate cylinder and diluted to a specific gravity of 1.12 and heated to 30° C. The solids in the diluted slurry were allowed to settle. The rate of settling was recorded in cm./hr. by measuring the clear layer that formed at the top of the cylinder.

The operational details and the results obtained in Example I are recorded in Table I.

TABLE I

| Example No. | I | II | III | IV | V |
| --- | --- | --- | --- | --- | --- |
| Anhydrite slurry: | | | | | |
| Anhydrite used, grams | 350 | 350 | 350 | 350 | 350 |
| Water, grams | 724 | 710 | 763 | 712 | 712 |
| H₂SO₄, grams | 56 | 70 | 101 | 68 | 68 |
| Solids, percent | 31 | 31 | 29 | 31 | 31 |
| H₂SO₄ in liquor, percent | 7.2 | 9.0 | 11.6 | 8.7 | 8.7 |
| Initial hydrolysis mixture: | | | | | |
| Anhydrite slurry, grams | 1,130 | 1,130 | 1,214 | 1,130 | 1,130 |
| Diluted anhydrite slurry, temp., °C | 95 | 90 | 95 | 90 | 90 |
| Titanium sulfate soln., grams | 678 | 526 | 1,004 | 524 | 524 |
| Titanium sulfate soln., temp., °C | 50 | 50 | 50 | 50 | 50 |
| Percent of total titanium sulfate soln. used | 17 | 13 | 25 | 13 | 13 |
| TiO₂ conc. in mixture, percent | 4.0 | 3.4 | 4.6 | 3.4 | 3.4 |
| H₂SO₄, conc. in mixture, percent | 11.0 | 11.5 | 14.0 | 11.5 | 11.5 |
| Temp. during initial hydrolysis, °C | 95 | 90 | 95 | 90 | 90 |
| Cure time of initial hydrolysis, min | 70 | 70 | 70 | 0 | 70 |
| Final hydrolysis mixture: | | | | | |
| Remaining titanium sulfate soln. used, grams | 3,317 | 3,522 | 3,010 | 3,504 | 3,504 |
| Initial hydrolysis mixture, temp., °C | (¹) | (¹) | (¹) | (¹) | (¹) |
| Time of addition of remaining titanium solution, minutes | 90 | 90 | 100 | 90 | 28 |
| Boiling time after final addition, hrs | 1½ | 1½ | 1½ | 1½ | 1½ |
| Settling rate, cm./hr | 17 | 32 | 29 | 0.6 | 4 |

¹ Boiling.

Calcination, at the rate of 90° C. per hour increase for the temperature range 800° C. to 975° C.

| Properties of Pigment: | | | |
| --- | --- | --- | --- |
| Rutile, percent | 91 | 92 | 97 |
| Tinting strength | 1,005 | 1,005 | 1,010 |
| Color brightness | 94.4 | 94.4 | 94.5 |
| Color tone | −8.2 | −7.9 | −8.1 |
| Spectral characteristic | 0.4 | 1.0 | 0.3 |
| TiO₂, percent | 50 | 50 | 50 |

Further runs were made using the procedure described in Example I except that variations were made in the concentrations and solution addition rates employed.

These runs are described as follows:

Example II

In this run the procedure of Example I was repeated except that an additional 15 grams of 96% H₂SO₄ were added to the anhydrite slurry to produce 9% H₂SO₄ in the anhydrite liquor. Only 13% of the total titanium solution was used in the initial hydrolysis mixture to give 11.5% H₂SO₄ in the initial hydrolysis mixture, close to the 11% obtained in Example I. In this way a 3.4% TiO₂ concentration was obtained in the initial hydrolysis mixture instead of 4% TiO₂ as obtained in Example I.

As in Example I the final titanium hydrate anhydrite mixture was found to be a rapid settling slurry i.e. 27 cm./hr. and was fast filtering. The titanium hydrate-anhydrite mixture upon calcination produced a composite pigment having the rutile structure. The operational details and pigment properties are recorded in Table I.

Example III

In this run the procedure of Example I was repeated except that both the amount of acid in the anhydrite slurry and the proportions of titanium solution in the initial hydrolysis mixture were increased. An additional 47 grams of 96% H₂SO₄ were added to the anhydrite slurry to produce 11.6% H₂SO₄ in the liquor. To this anhydrite slurry was added 35% of the total titanium solution to produce 4.6% TiO₂ and 14% H₂SO₄ in the initial hydrolysis mixture instead of 4% TiO₂ and 11% H₂SO₄ as obtained in Example I. Again a fast settling, i.e. 29 cm./hr., titanium hydrate-anhydrite mixture was obtained. The results are recorded in Table I.

Example IV

In this run, the procedure of Example II was repeated except that the initial hydrolysis mixture was not held but was immediately heated to a boil and addition of the remaining titanium sulfate solution was started at a slow rate. Thus the cure time was zero instead of 70 minutes as used in Example II. As a result, the setting rate of the final titanium hydrate-anhydrite mixture was slow, 0.6 cm./hr. These results and other details are recorded in Table I. Because of the unsatisfactory settling rate the composite mixture was not calcined to a finished product for evaluation of pigment properties.

Example V

In this run, the procedure of Example II was repeated except that the initial hydrolysis mixture was not brought to a boil and the remaining titanium sulfate solution was added at a more rapid rate than that used in previous examples. The addition of the remaining 87% of the titanium solution required only 28 minutes instead of the 90 minutes used in Example II. The settling rate of the final titanium hydrate-anhydrite mixture was again slow, 4 cm./hr. The results are recorded in Table I.

Example VI

This example describes the method for preparing a rutile TiO₂-anhydrite composite pigment containing 30% TiO₂ and 70% anhydrite.

In this example 1935 grams of the same type of calcium sulfate anhydrite slurry described in Example I and containing 31% solid and 96% grams of $H_2SO_4$ were heated to 95° C.; the acid concentration in the liquor amounted to 7.2% $H_2SO_4$.

1090 grams of the same type of titanium sulfate solution were heated to 50° C. and added to the anhydrite slurry at 95° C. over a period of 12 minutes to form an initial hydrolysis mixture containing 11.2% $H_2SO_4$ and 3.8% $TiO_2$. This amount of titanium sulfate solution is 35% of the total titanium sulfate solution to be used to form the 30% $TiO_2$-70% anhydrite composite pigment.

This initial hydrolysis mixture was heated to 95° C. and held at 95° C. for 60 minutes, after which the remaining 65% of the titanium sulfate solution was then added slowly (i.e. over a period of 60 minutes) to the initial hydrolysis mixture to form the final hydrolysis mixture which was heated to boiling before the addition period and boiled for an additional one hour after all of the solution had been added to hydrolyze all of the titanium values in the mixture. Upon standing the titanium hydrate-anhydrite mixture had a rapid settling rate of 11 cm./hr.

Upon decanting, washing and bleaching, the titanium hydrate-anhydrite mixture was treated and calcined in the same manner as that previously described in Example I. The composite pigment produced has the following properties:

| | |
|---|---|
| Tinting strength | 690 |
| Rutile (percent) | 96 |
| Color brightness | 94.1 |
| Color tone | −8.6 |
| Spectral characteristics | 1.0 |
| $TiO_2$ (percent) | 30.0 |

The operational details and results obtained are recorded in Table II.

TABLE II

| Example No | VI | VII | VIII | IX |
|---|---|---|---|---|
| Anhydrite slurry: | | | | |
| Anhydrite used, grams | 600 | 600 | 600 | 600 |
| Water, grams | 1,239 | 1,197 | 1,239 | 1,239 |
| $H_2SO_4$, grams | 96 | 138 | 96 | 96 |
| $H_2SO_4$, percent | 7.2 | 10.4 | 7.2 | 7.2 |
| Solids, percent | 31 | 31 | 31 | 31 |
| Initial hydrolysis mixture: | | | | |
| Anhydrite slurry, grams | 1,935 | 1,935 | 1,935 | 1,935 |
| Diluted anhydrite slurry, temp., °C | 95 | 95 | 95 | 95 |
| Titanium sulfate soln., grams | 1,090 | 1,090 | 1,090 | 1,090 |
| Titanium sulfate soln., temp., °C | 50 | 50 | 50 | 50 |
| Percent of total titanium sulfate soln., used | 35 | 35 | 35 | 35 |
| $H_2SO_4$ added, grams | 0 | 0 | 0 | 0 |
| $TiO_2$ conc. in mixture, percent | 3.8 | 3.8 | 3.8 | 3.8 |
| $H_2SO_4$ conc. in mixture, percent | 11.2 | 13.0 | 11.2 | 11.2 |
| Temp. during initial hydrolysis, °C | 95 | 95 | 95 | 95 |
| Cure time of initial hydrolysis (min.) | 60 | 60 | 60 | 30 |
| Final hydrolysis mixture: | | | | |
| Remaining titanium sulfate soln. used, grams | 2,020 | 2,020 | 2,020 | 2,020 |
| Initial hydrolysis mixture, temp., °C | (¹) | (¹) | (¹) | (¹) |
| Time of addition of remaining titanium solution, minutes | 60 | 60 | 1 | 60 |
| Boiling time after final addition, hrs | 1 | 1 | 2 | 1 |
| Settling rate, cm./hr | 11 | 15 | 1 | 3 |

¹ Boiling.

Calcination, at the rate of 90° C. per hour increase for the temperature range 800° C. to 1075° C.

| Properties of Pigment: | | |
|---|---|---|
| Rutile, percent | 96 | 95 |
| Tinting strength | 690 | 690 |
| Color brightness | 94.1 | 94.2 |
| Color tone | −8.6 | −8.4 |
| Spectral characteristic | 1.0 | 1.0 |
| $TiO_2$, percent | 30 | 30 |

Further runs were made using the procedure described in Example VI (to produce pigments containing 30% $TiO_2$) except that variations were made in the concentrations and solution addition rates employed.

These runs are described as follows:

Example VII

In this run the procedure of Example VI was repeated except that an additional 44 grams of 96% $H_2SO_4$ were added to the anhydrite slurry to produce 10.4% $H_2SO_4$ in the anhydrite slurry and 13% $H_2SO_4$ in the initial hydrolysis mixture.

As a result of the increased amount of acid, the settling rate of the final titanium hydrate-anhydrite slurry was 15 cm./hr. as compared to the 11 cm./hr. obtained in Example VI. The titanium hydrate-anhydrite mixture upon calcination produced a comprise pigment containing the rutile form of $TiO_2$. The operational details and pigment properties are recorded in Table II.

Example VIII

In this run the procedure of Example VI was repeated except that the remaining titanium solution was added rapidly, decreasing the temperature below 100° C. for a brief period. As shown in Table II, the composite titanium hydrate-anhydrite mixture produced had an unsatisfactory settling rate of only 1 cm./hr. which is uneconomical to handle on a plant scale.

Example IX

In this run the procedure of Example VI was repeated except that the initial hydrolysis mixture was held for only 30 minutes (cure time) before the slow addition of the remaining titanuim sulfate solution. As shown in Table II, the settling rate of the titanium hydrate-anhydrite mixture was again unsatisfactory (only 3 cm./hr.).

While this invention has been described and illustrated by the examples shown, it is not intended to be strictly limited thereto, and other variation and modifications may be employed within the scope of the following claims.

We claim:

1. A process for producing a rutile titanium dioxide-calcium sulfate composite pigment which comprises: preparing a titanium sulfate-ferrous sulfate solution and a calcium sulfate anhydrite aqueous slurry, the titanium concentration in said titanium sulfate-ferrous sulfate solution calculated as titanium dioxide is from 8% to 10% and the concentration of sulfuric acid in said solution is from 15% to 20% with a weight ratio of $H_2SO_4/TiO_2$ being from 1.8 to 2.3, the amounts of said solution and said slurry used in said process being the calculated amount to form a predetermined composition of a final calcined composite pigment which falls within the range of from 25% to 60% titanium dioxide and the remainder calcium sulfate anhydrite, said slurry containing a solid content of anhydrite from 12% to 32%, adding to said slurry from 7% to 40% of said titanium sulfate-ferrous sulfate solution to form an initial hydrolysis mixture containing from 10% to 17% $H_2SO_4$ and from 2.5% to 6% $TiO_2$, holding said initial hydrolysis mixture at a temperature from 90° C. to 98° C. for 30 to 90 minutes to cure said mixture, heating said cured mixture to boiling temperature and adding the remainder of said titanium sulfate-ferrous sulfate solution to said initial hydrolysis mixture while boiling over a period of from 30 to 100 minutes thus forming a final hydrolysis mixture and boiling said final mixture to hydrolyze, in the presence of said anhydrite, the remainder of the titanium values from said solution, filtering, washing and bleaching said titanium hydrate-anhydrite mixture formed to remove the ferrous sulfate therefrom and after adding thereto ZnO in amount from 0.2% to 2.0% based on weight of $TiO_2$, but without the addition of a titanium-containing rutile promoting agent, calcining said hydrate-anhydrite mixture at temperatures from 800° C. to 1100° C. and grinding the calcined product thereby producing a rutile titanium dioxide-calcium sulfate anhydrite composite pigment.

2. Process according to claim 1 in which the composite pigment produced contains $TiO_2$ in amount which falls within the lower portion of the broad composition range of from 25% to 60%, and is about 30% $TiO_2$, said process comprising adding from 20% to 40% of the total titanium sulfate-ferrous sulfate solution to the anhydrite slurry to form the initial hydrolysis mixture, the initial mixture containing from 10% to 17% $H_2SO_4$ and from 2.5% to 4.5% $TiO_2$, curing the initial mixture at temperatures from 90° C. to 98° C. for 30 to 90 minutes and adding the remainder of titanium sulfate-ferrous sulfate solution to the cured and boiling mixture over a period of from 30 to 90 minutes.

3. Process according to claim 1 in which the composite pigment produced contains $TiO_2$ in amounts which fall within the higher portion of the broad composition range of from 25% to 60%, and is about 50% $TiO_2$, said process comprising adding from 7% to 30% of the total titanium sulfate-ferrous sulfate solution to the anhydrite slurry to form the initial hydrolysis mixture, the initial mixture containing from 10% to 17% $H_2SO_4$ and from 2.5% to 6% $TiO_2$, curing the initial mixture at temperatures from 90° C. to 98° C. for 30 to 90 minutes and adding the remainder of titanium sulfate-ferrous sulfate solution to the cured and boiling mixture over a period of from 40 to 100 minutes.

4. Process according to claim 1 in which the anhydrite slurry employed contains sufficient sulfuric acid so that the initial hydrolysis mixture will contain from 10% to 17% sulfuric acid.

References Cited

UNITED STATES PATENTS

| | | | |
|---|---|---|---|
| 2,369,468 | 2/1945 | Kingsbury et al. | 106—300 |
| 2,744,028 | 5/1956 | Grave | 106—300 |
| 2,760,880 | 8/1956 | Grave | 106—300 |
| 3,073,711 | 1/1963 | Doll et al. | 106—300 |

TOBIAS E. LEVON, *Primary Examiner.*

S. E. MOTT, *Assistant Examiner.*

U.S. Cl. X.R.

106—306